United States Patent [15] 3,671,051
Werft [45] June 20, 1972

[54] VEHICLE

[72] Inventor: August R. Werft, 233 Dixon Boulevard, Uniontown, Pa. 15401

[22] Filed: Aug. 11, 1970

[21] Appl. No.: 62,985

Related U.S. Application Data

[63] Continuation-in-part of Ser. No. 871,823, Oct. 28, 1969, abandoned.

[52] U.S. Cl. ..........................280/11.1 ET, 280/28.5, 305/7, 305/14, 305/16, 305/35 EB
[51] Int. Cl. ..................................................A63c 17/10
[58] Field of Search ..................280/11.1 ET, 28.5; 301/14, 301/16, 35 EB, 60, 19, 7, 32, 34

[56] References Cited

UNITED STATES PATENTS

| | | | |
|---|---|---|---|
| 342,457 | 5/1886 | Peirce | 280/11.1 ET |
| 359,468 | 3/1887 | Peirce | 305/16 |
| 654,291 | 7/1900 | Stith | 280/28.5 |
| 849,882 | 4/1907 | Bartley | 305/14 |
| 2,260,027 | 10/1941 | Hotson | 280/11.1 ET |
| 2,412,290 | 12/1946 | Rieske | 280/11.1 ET |
| 2,575,845 | 11/1951 | Singer | 305/14 |
| 3,104,084 | 9/1963 | Lovercheck | 305/14 X |
| 3,395,928 | 8/1968 | Eglit | 280/11.13 L |

*Primary Examiner*—Benjamin Hersh
*Assistant Examiner*—Milton L. Smith
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

An endless belt vehicle which, for example, might take the form of a sled, scooter, wagon or skate. The endless belt passes over nonrotating belt housings having belt retaining grooves in the periphery thereof with a coating of a material which when lubricated provides a substantially frictionless surface, while not being adversely affected by the lubricant. Means can also be provided to adjust the belt tension and thus to control the speed.

28 Claims, 8 Drawing Figures

PATENTED JUN 20 1972 3,671,051

INVENTOR
August R. Werft

INVENTOR
AUGUST R. WERFT

BY McLean, Morton & Boustead
ATTORNEYS

PATENTED JUN 20 1972 3,671,051

INVENTOR
AUGUST R. WERFT

BY *McLean, Morton & Boustead*
ATTORNEYS

VEHICLE

This application is a continuation-in-part of U.S. Pat. application, Ser. No. 871,823, filed Oct. 28, 1969, and now abandoned.

The present invention pertains to endless belt vehicles. More particularly, the present invention pertains to vehicles such as sleds, wagons, scooters and skates utilizing an endless belt drive system and incorporating a lubricating system to provide substantially frictionless operation and capable of incorporating a belt tension control system.

Vehicles such as sleds, wagons, scooters and skates generally have utilized runners or a plurality of wheels which roll over the supporting surface and which are connected to the vehicle by axles, requiring the whole wheel assembly to rotate around the axle. In contrast, the present invention replaces these runners and wheels with one or more endless belts which become the only moving members of the vehicle and incorporates a lubricating system and, if desired, a tension control system for the endless belt. The result is a vehicle with fewer moving parts, giving a more entertaining ride than do conventional vehicles, and providing considerable exercise for the user.

Endless belt vehicles have been previously proposed, for example, as disclosed in U.S. Pat. No. 2,412,290, issued Dec. 10, 1946 to Otto G. Rieske. Such vehicles have, however, simply run an endless belt over wheels, and they depend upon friction between the belt and the wheels to drive the vehicle. In such devices when the endless belt is sufficiently loose to permit the operator to move the vehicle, the belt tends to climb out of the belt-retaining grooves in the wheels. Conversely, when the belt is sufficiently tight to retain it within the grooves, the vehicle requires too much effort to move it, and therefore satisfactory operation cannot be satisfied.

The present invention is an endless belt vehicle providing smooth operation and permitting control of the force required to operate the vehicle. One aspect of the present invention is a vehicle provided with one or more endless belts which operate over one or more bearingless, nonrotating belt housings having surfaces which when lubricated are substantially frictionless. If desired, solid or liquid lubrication can be provided either by hand or by means of a lubricant supply system. Means also can be provided for controlling the tension of the belt to vary the force required to move the vehicle. The low coefficient of friction between the belt and the belt housing prevents the belt from climbing out of its grooves. The vehicle might take the form of a scooter, a sled, a wagon, a skate, or any other such vehicle. If desired, the vehicle can have two or more parallel endless belts in accordance with the present invention, either side by side or one behind the other in line or staggered.

These and other aspects and advantages of the present invention are more apparent in the following detailed description and claims, particularly when considered in conjunction with the accompanying drawings in which like parts bear like reference numerals. In the drawings:

Figure 1:
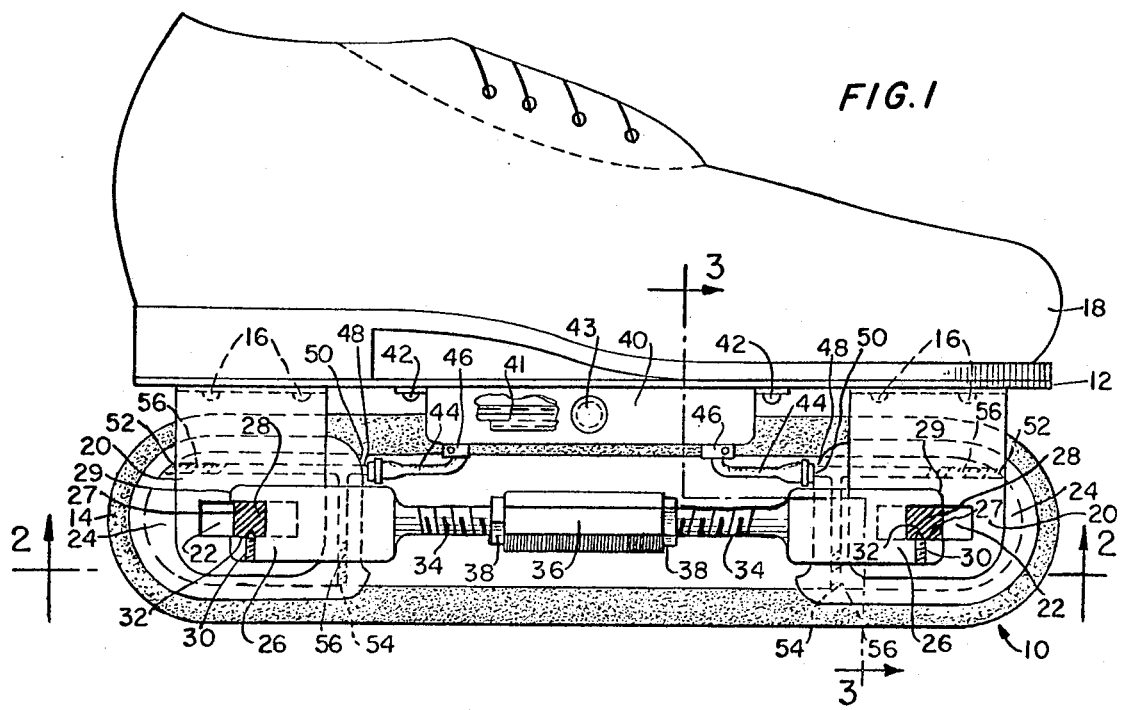
FIG. 1 is an elevational view of a vehicle in accordance with the present invention.
Figure 2:
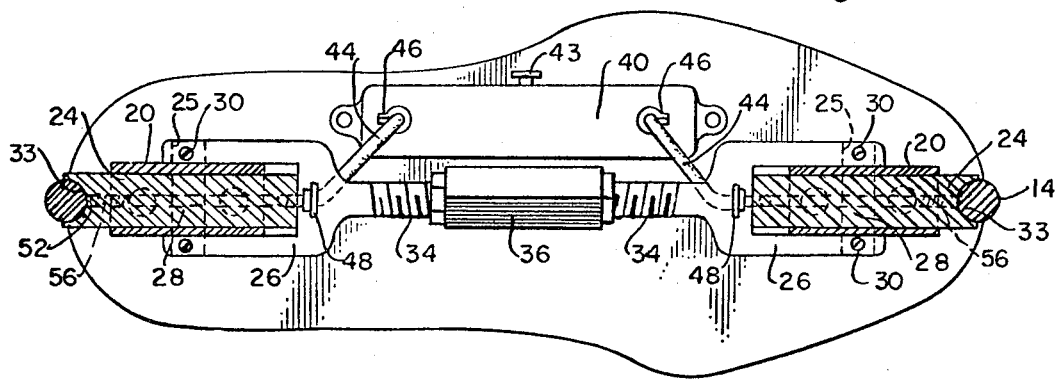
FIG. 2 is a bottom plan view, partially in section, taken along line 2—2 of FIG. 1.
Figure 3:
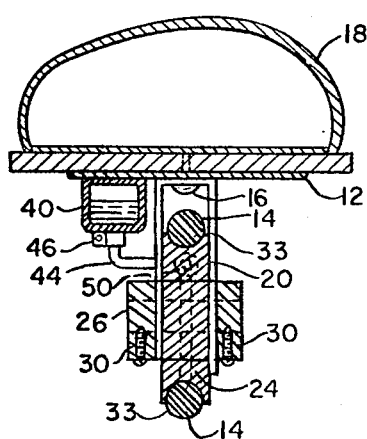
FIG. 3 is a sectional view taken along line 3—3 of FIG. 1.

As depicted in FIG. 1, vehicle 10, which is illustratively depicted as a skate, includes a support member 12 and an endless belt 14. In the illustrative example of FIG. 1, support plate 12 of skate 10 is connected by means such as bolts 16 to a shoe 18 which might be an oxford as shown or which might be a high boot. Alternatively, of course, skate 10 can be provided without a shoe but instead having means such as a heel holder, an ankle strap, and an adjustable sole clamp to permit attachment to a conventional shoe. A first bracket 20 is connected by bolts 16 to the underside of plate 12 near the forward end of skate 10. Likewise, a second bracket 20 is connected by bolts 16 to the underside of plate 12 near the rear end of skate 10. As seen in FIGS. 1, 2, and 3, each bracket 20 has a substantially U-shaped cross-section.

The embodiment of FIGS. 1-3 includes a tension control system for endless belt 14. In each side of each bracket 20 a horizontal slot 22 is provided. A substantially oval belt housing 24 and a yoke member 26 are provided at each bracket 20. Each housing 24 has a substantially square opening 25 transversely therethrough. Each yoke 26 has a horizontal groove 27 across its end face 29. With these square openings 25 and grooves 27 aligned and in line with slots 22, as depicted in the drawings, a substantially square support shaft 28 fits through the openings to join each yoke member 26 and housing 24 to the respective brackets 20. A tapped opening is provided on each side of each yoke member 26, and a bolt 30 is threaded into each tapped opening and extends into a corresponding recess 32 in the corresponding support shaft 28 to retain the shafts 28 in their proper positions.

Each yoke 26 terminates in a neck 34. The necks 34 are oppositely threaded and are joined by turnbuckle 36. Nuts 38 on either side of turnbuckle 36 permit locking the turnbuckle in position. With lock nuts 38 loosened, turnbuckle 36 can be rotated to adjust the positions of the oval belt housings 24, thereby varying the tension on endless belt 14 to control the amount of effort required by the operator to travel on skate 10 or alternatively to control the speed at which the operator skates with a given amount of effort. Thus, regardless of the weight of the skater the skate can be adjusted to travel at the desired speed with the desired exertion by the user. If desired, only one bracket 20 need be provided with horizontal slots 22, since ample tension adjustment can be achieved with only one belt housing 24 movable.

As seen in FIGS. 1-3, the periphery of each oval belt housing 24 includes a groove 33 to retain endless belt 14. Grooves 33 are contoured to match the cross-section of belt 14 and thus might be semi-circular or might have whatever shape best mates with belt 14 such as sloping sides with a flat bottom. Sufficient clearance is provided between belt 14 and groove 33 to prevent crowding due to natural deformation of the belt when under load in use and to minimize friction. Such clearance also aids in guidance and turning of vehicle 10. The surface of each groove 33 is coated or lined with a substance which when lubricated has a low coefficient of friction. A suitable substance is tetrafluorethylene, available under the trademark Teflon. Alternatively, a ceramic porcelain coating could be utilized. As another alternative the entire belt housing 24 could be molded of a suitable material such as nylon, acrylic or a lubricant impregnated pressed powdered metal.

In the embodiment of FIGS. 1-3 a lubricant supply system is provided. Thus, the material from which the coating on the surface of each groove 33 is made is such that the coefficient of friction of the grooves 33 is substantially lower when the grooves 33 are lubricated, and yet the coating is not adversely affected by the lubricant. Teflon and ceramic are suitable materials for this coating. Lubricant reservoir 40 is attached to the underside of plate 12 by means such as bolts 42. Threaded plug 43 is provided for filling lubricant reservoir 40. Discharge tubes 44 are connected to each end of reservoir 40 by means of clamps 46. The tubes 44 connect by means of nipples 48 to conduits 50 within belt housings 24.

Each conduit 50 communicates with the groove 33 of its housing 24, for example at an upper terminal 52 and at a lower terminal 54. A felt plug 56 is provided within each terminal 52, 54 to meter lubricant onto the interface of belt 14 and housings 24. The plugs 56 wipe lubricant on belt 14 as belt 14 moves within grooves 33. Thus belt 14 moves within grooves 33 with little resistance. Belt 14 can be made of a material which is not adversely affected by the lubricant 41, for example a material such as neoprene, flexible urethane, or Linatex.

Alternatively, a composite belt can be utilized having its inner portion in contact with grooves 33 of a material such as these and its outer portion away from grooves 33 of a longer wearing material. If desired, belt 14 can itself be impregnated with a lubricating material such as lithium or graphite.

Figure 4:
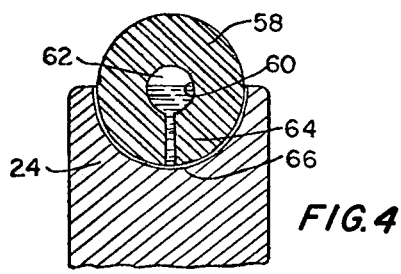
FIG. 4 is an enlarged fragmentary sectional view depicting a modified form of endless belt suitable for use in the present invention.

In place of the lubricant reservoir system 40–56, an endless belt with a built-in reservoir can be utilized, as depicted in FIG. 4. Endless belt 58 has a hollow core 60 filled with lubricant 62. Belt 58 has one or more small openings 64 running from core 60 to inner surface 66 through which lubricant 62 passes to lubricate the interface of belt 58 and housings 24. As belt 58 passes from the lower, floor-contacting side of housings 24 to the upper side thereof, it is alternately squeezed and released, and the resulting pumping action causes lubricant to pass through opening 64. If desired, opening 64 can include means such as a ball valve which opens on contact with housing 24 or such as a felt plug to meter the lubricant 62, thereby assuring smooth flow. Lubricant 62 can be provided to core 60 either through opening 64 or by means of hypodermic type syringe. As another alternative, hollow-chambers within belt housings 24 could be used as lubricant reservoirs if desired.

Figure 5:
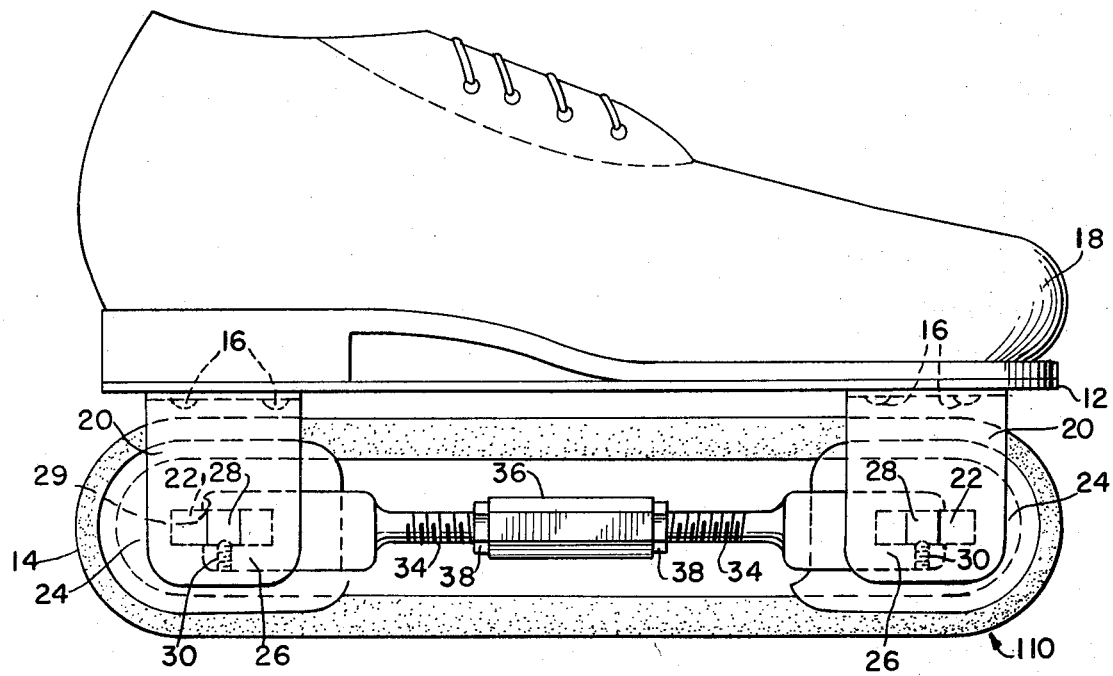
FIGS. 5, 6 and 7 are elevational views of other embodiments of vehicles in accordance with the present invention.

FIGS. 1 through 3 depict the endless belt vehicle of the present invention with both a lubricating system and a tension control system. Endless belt vehicles can be provided in accordance with the present invention while omitting one or both of these systems. FIG. 5 depicts an endless belt skate similar to that shown in FIGS. 1 through 3 but omitting the lubricating system. All other components are identical, and the same reference numerals are utilized. A lubricant such as a light oil can be applied by hand to the inner surface of belt 14, for example, from a small can or from an oil-soaked cloth. In addition, as stated above, belt 14 can be impregnated with a lubricating material such as lithium or graphite, if desired.

Figure 6:
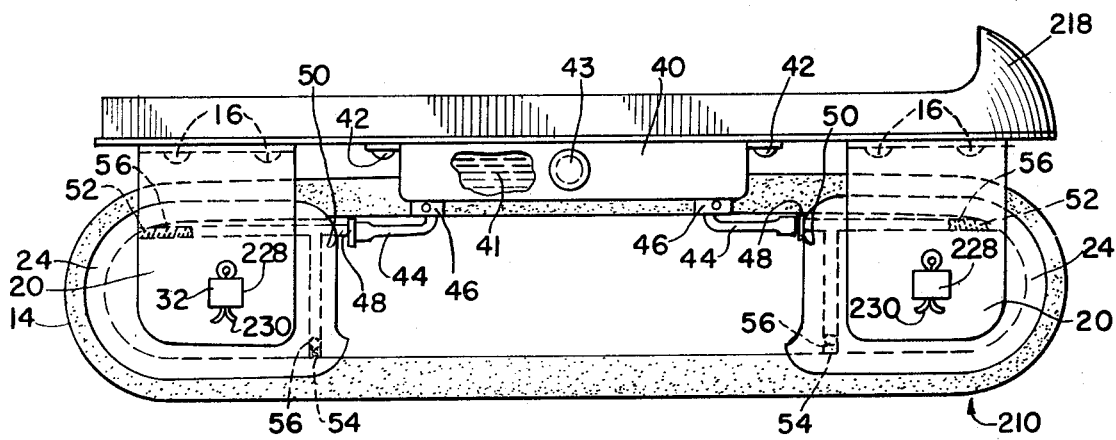

FIG. 6 depicts an endless belt vehicle in the form of a wagon or sled 210 having a lubricating system but omitting the tension control system. Cargo section 218 is provided in place of shoe 18 of skate 10 in FIG. 1, and the tension control system, including components 26–38 of FIG. 1, has been omitted. Each belt housing 24 might retain a single belt 14, as with the skate of FIGS. 1–3, or alternatively might retain two parallel belts laterally displaced in side-by-side relationship. Since yoke members 26 and turnbuckle 36 are omitted, each belt housing 24 can be connected directly to its bracket 20, for example, by having a support shaft 228 passing through openings in those components and held in place by means such as cotter pins 230.

Figure 7:
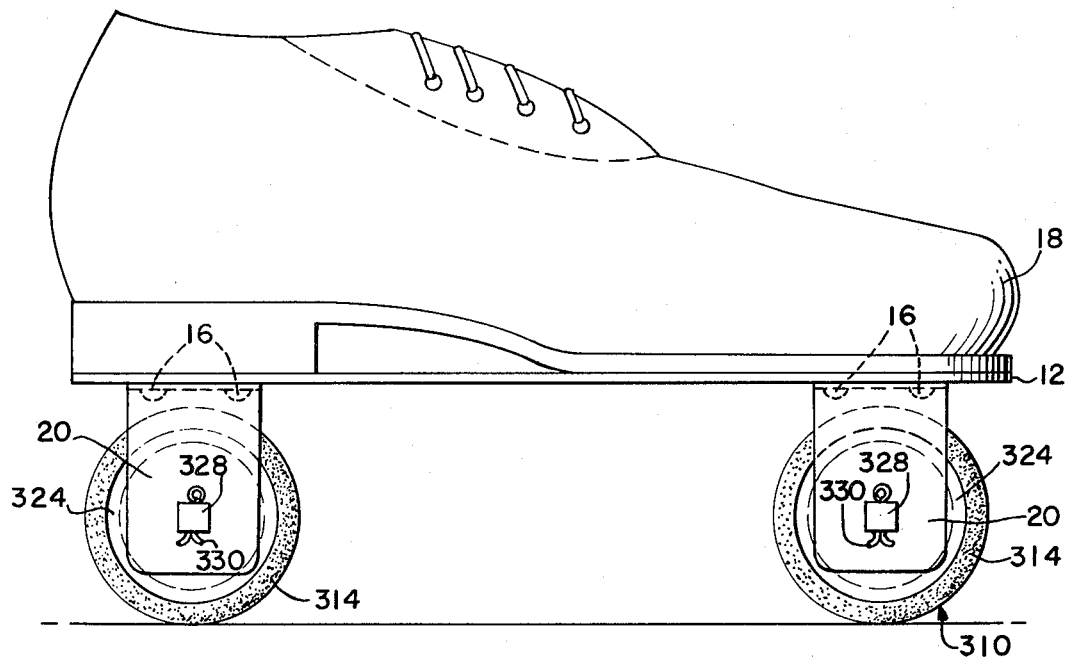

FIG. 7 depicts a skate-type endless belt vehicle 310 in which two longitudinally displaced endless belts 314 are provided. Each belt 314 only moves around its own belt housing 324. Again the belt housings 324 can be held to their respective brackets 20 by shafts 328 and cotter pins 330. A lubricating system such as that in FIGS. 1–3 and 6 or such as that in FIG. 4 could, of course, be added to the skate of FIG. 7 if desired, and each belt housing 324 could retain two parallel belts laterally displaced.

Figure 8:
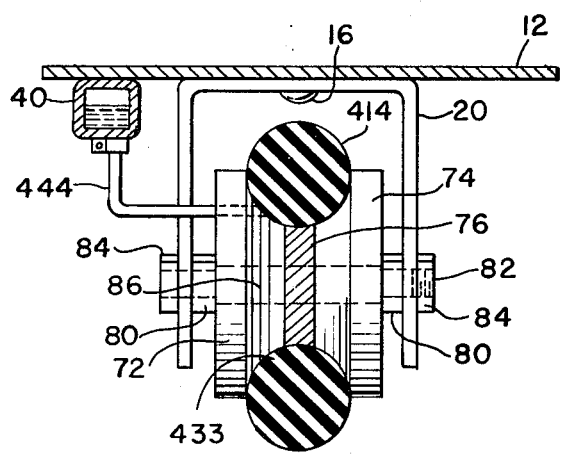
FIG. 8 is a sectional view depicting a modified form of the present invention.

If circular belt housings are employed through which belts operate, as in FIG. 7, then if desired, as depicted in FIG. 8, the belt housing can be formed of two halves 72 and 74, and an expanding filler or gasket 76, preferably made of a material such as flexible neoprene, can be incorporated between the two halves to provide tension control on endless belt 414. As nuts 80 are tightened on the threaded ends of supporting shaft 428, the filler 76 expands with resultant increased tension on belt 414, and conversely when nuts 80 are loosened, belt 414 receives less tension. Suitable threads are provided on the ends of the square support shaft 428 to match nuts 80 and holding nuts 84. The bracket openings 86 through the housing halves 72 and 74 are square in cross-section to match the square supporting shaft 428. A lubricant reservoir 40 can be provided to provide lubricant via tube 444 to the inner surface of belt retaining groove 433.

It is thus seen that the present invention provides an improved endless belt vehicle which can include a tension control system and a lubricating system for the endless belt. The vehicle might take any of several forms, and thus although the present has been described with reference to preferred embodiments, numerous alterations and rearrangements can be made, and still the result would come within the scope of the invention.

What is claimed is:

1. A vehicle comprising a support plate; a first endless belt; nonrotating attachment means adjustably attaching said first endless belt to said support plate to cause said first endless belt to form a movable, ground-engaging surface, said attachment means permitting tension-controlling adjustment of said first endless belt, said attachment means having at the interface of said attachment means and said first endless belt a surface which when lubricated is substantially frictionless; and a lubricating system for providing a lubricating fluid to the interface of said attachment means and said first endless belt, said attachment means including:

first and second belt housings each having a belt-retaining groove for retaining said first endless belt with a ground-engaging surface adapted for movement of said vehicle over the ground, said groove including a surface which when lubricated is substantially frictionless;

first and second bracket members connected to first and second ends of said support plate;

first and second yoke means;

first and second retaining means, each retaining means connecting an associated yoke means and an associated belt housing with an associated bracket member, at least one of said last-named connections being adjustable; and adjustable connecting means adjustably connecting said first yoke means with said second yoke means to permit movement of one of said belt housings relative to the other of said belt housings upon adjustment of said connecting means to control tension in said first endless belt.

2. A vehicle as claimed in claim 1 in which said support plate is adapted for attachment to a shoe to provide a skate.

3. A vehicle as claimed in claim 1 further comprising a shoe attached to said support plate to provide a skate.

4. A vehicle as claimed in claim 1 further comprising means attached to said support plate for defining a cargo section.

5. A vehicle as claimed in claim 1 in which said lubricating system comprises a lubricant reservoir adapted to hold liquid lubricant; at least one lubricant conduit in each belt housing and communicating with said belt-retaining grooves; and means for coupling said reservoir to said conduits to permit flow of lubricant from said reservoir through said conduits to said belt-retaining grooves.

6. A vehicle as claimed in claim 5 in which each conduit includes means for metering lubricant flow to said belt-retaining grooves.

7. A vehicle as claimed in claim 1 in which said first endless belt has a hollow core adapted to hold liquid lubricant and having at least one opening communicating between said hollow core and said belt-retaining grooves as said first endless belt moves over said belt housings to permit flow of lubricant from said hollow core to said belt-retaining grooves, whereby said first endless belt with the hollow core and the at least one opening constitute the lubricating system.

8. A vehicle as claimed in claim 1 in which said groove surface is a tetrafluorethylene coated surface.

9. A vehicle as claimed in claim 1 in which said groove surface is a ceramic porcelain coated surface.

10. A vehicle as claimed in claim 1 including a second endless belt adjustably attached by said attachment means to said support plate to form a second movable, ground-engaging surface parallel to said first ground-engaging surface.

11. A vehicle comprising a support plate; an endless belt; nonrotating attachment means attaching said endless belt to said support plate to cause said endless belt to form a movable, ground-engaging surface, said attachment means having when lubricated a substantially frictionless surface at the interface of said attachment means and said belt; said endless belt having a hollow core adapted to hold liquid lubricant and having at least one opening for communicating between said hollow core and the interface of said attachment means and said endless belt to permit flow of lubricant from said hollow core to said interface as said endless belt moves over said attachment means, whereby said endless belt with the hollow core and the at least one opening constitute a lubricating system for providing lubricant to the interface of said attachment means and said endless belt.

12. A vehicle as claimed in claim 11 in which the at least one opening includes means for metering lubricant flow to said interface.

13. A vehicle as claimed in claim 11 in which said groove surface is a tetrafluorethylene coated surface.

14. A vehicle as claimed in claim 11 in which said groove surface is a ceramic porcelain coated surface.

15. A vehicle comprising a support plate; a first endless belt; nonrotating attachment means adjustably attaching said first endless belt to said support plate to cause said first endless belt to form a movable, ground-engaging surface, said attachment means permitting tension-controlling adjustment of said first endless belt, said attachment means having when lubricated a substantially frictionless surface at the interface of said attachment means and said first endless belt, said attachment means including:

first and second belt housings each having a belt-retaining groove for retaining said first endless belt with a ground-engaging surface adapted for movement of said vehicle over the ground, said groove including, a surface which when lubricated is substantially frictionless;

first and second bracket members connected to first and second ends of said support plate;

first and second yoke means;

first and second retaining means, each retaining means connecting an associated yoke means and an associated belt housing with an associated bracket member, at least one of said last-named connections being adjustable; and adjustable connecting means adjustably connecting said first yoke means with said second yoke means to permit movement of one of said belt housings relative to the other of said belt housings upon adjustment of said connecting means to control tension in said first endless belt.

16. A vehicle as claimed in claim 15 further comprising means for applying a lubricant to the interface of said attachment means and said belt.

17. A vehicle as claimed in claim 15 including a second endless belt adjustably attached by said attachment means to said support plate to form a second movable, ground-engaging surface parallel to said first ground-engaging surface.

18. A vehicle comprising a support plate; a first endless belt; a second endless belt; nonrotating attachment means adjustably attaching said first and second endless belts to said support plate to cause said first and second endless belts to form first and second movable, ground-engaging surfaces, said attachment means permitting tension-controlling adjustment of said first and second endless belts, said attachment means having at the interfaces of said attachment means and said first and second endless belts first and second surfaces which when lubricated are substantially frictionless; and a lubricating system for providing a lubricating fluid to the interfaces of said attachment means and said first and second endless belts, said attachment means comprising:

a. first and second belt housings, each belt housing including:
  i. a first belt housing portion;
  ii. a second belt housing portion;
  iii. a flexible filler portion; and
  iv. mounting means for mounting said first and second belt housing portions with said flexible filler portion therebetween to define a belt-retaining groove for retaining an associated one of said first and second endless belts with a ground-engaging surface adapted for movement of said vehicle over the ground, that part of said belt-retaining groove made up of said first and second belt housing portions including a surface which when lubricated is substantially frictionless, said mounting means including adjustable means permitting adjustment of the spacing between said first and second belt housing portions in which said flexible filler portion is situated; and b. first and second bracket members coupling said first and second belt housings to first and second ends of said support plate.

19. A vehicle as claimed in claim 18 in which said support plate is adapted for attachment to a shoe to provide a skate.

20. A vehicle as claimed in claim 18 further comprising a shoe attached to said support plate to provide a skate.

21. A vehicle as claimed in claim 18 further comprising means attached to said support plate for defining a cargo section.

22. A vehicle as claimed in claim 18 in which said lubricating system comprises a lubricant reservoir adapted to hold liquid lubricant; at least one lubricant conduit in each belt housing and communicating with said belt-retaining grooves; and means for coupling said reservoir to said conduits to permit flow of lubricant from said reservoir through said conduits to said belt-retaining grooves.

23. A vehicle as claimed in claim 22 in which each conduit includes means for metering lubricant flow to said belt-retaining grooves.

24. A vehicle as claimed in claim 18 in which each of said first and second endless belts as a hollow core adapted to hold liquid lubricant and has at least one opening communicating between said hollow core and the associated one of said belt-retaining grooves as said first and second endless belts move over said belt housings to permit flow of lubricant from said first and second endless belt hollow cores to said belt-retaining grooves, whereby said first and second endless belts with the hollow cores and the openings constitute the lubricating system.

25. A vehicle as claimed in claim 18 in which each said groove surface includes a tetrafluorethylene coated surface.

26. A vehicle as claimed in claim 18 in which each said groove surface includes a ceramic porcelain coated surface.

27. A vehicle comprising a support plate; a first endless belt; a second endless belt; nonrotating attachment means adjustably attaching said first and second endless belts to said support plate to cause said first and second endless belts to form first and second movable, ground-engaging surfaces, said attachment means permitting tension-controlling adjustment of said first and second endless belts, said attachment means having when lubricated a substantially frictionless surface at the interfaces of said attachment means and said first and second belts, said attachment means comprising:

a. first and second belt housings, each belt housing including:
  i. a first belt housing portion;
  ii. a second belt housing portion;
  iii. a flexible filler portion; and
  iv. mounting means for mounting said first and second belt housing portions with said flexible filler portion therebetween to define a belt-retaining groove for retaining an associated one of said first and second endless belts with a ground-engaging surface adapted for movement of said vehicle over the ground, that part of said belt-retaining groove made up of said first and second belt housing portions including a surface which when lubricated is substantially frictionless, said mounting means including adjustable means permitting adjustment of the spacing between said first and second belt housing portions in which said flexible filler portion is situated; and b. first and second bracket members coupling said first and second belt housings to first and second ends of said support plate.

28. A vehicle as claimed in claim 27 further comprising means for applying a lubricant to the interfaces of said attachment means and said first and second endless belts.

* * * * *